US012591402B2

(12) United States Patent
Tyurin et al.

(10) Patent No.: US 12,591,402 B2
(45) Date of Patent: Mar. 31, 2026

(54) AUGMENTED REALITY COLLABORATION SYSTEM WITH ANNOTATION CAPABILITY

(71) Applicant: QUALCOMM Incorporated, San Diego, CA (US)

(72) Inventors: Alexander Tyurin, San Mateo, CA (US); Gerald V. Wright, Jr., San Mateo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 17/522,797

(22) Filed: Nov. 9, 2021

(65) Prior Publication Data

US 2022/0083307 A1     Mar. 17, 2022

Related U.S. Application Data

(63) Continuation-in-part of application No. 17/023,220, filed on Sep. 16, 2020, now Pat. No. 11,176,756, and
(Continued)

(51) Int. Cl.
G06F 3/01 (2006.01)
G06F 3/14 (2006.01)
(Continued)

(52) U.S. Cl.
CPC ............ G06F 3/1454 (2013.01); G06F 3/012 (2013.01); G06F 16/5866 (2019.01);
(Continued)

(58) Field of Classification Search
None
See application file for complete search history.

(56) References Cited

U.S. PATENT DOCUMENTS

| | | | |
|---|---|---|---|
| 9,734,634 B1 * | 8/2017 | Mott ...................... | G06F 3/002 |
| 10,182,210 B1 * | 1/2019 | Goetzinger, Jr. ...... | H04N 7/147 |

(Continued)

FOREIGN PATENT DOCUMENTS

| | | |
|---|---|---|
| EP | 2771877 B1 | 10/2017 |
| WO | 2016073185 A1 | 5/2016 |
| WO | 2018222756 A1 | 12/2018 |

OTHER PUBLICATIONS

PCT International Search Report and the Written Opinion mailed Feb. 2, 2023, issued in related International Application No. PCT/US2022/079263 (13 pages).
(Continued)

*Primary Examiner* — David H Chu
(74) *Attorney, Agent, or Firm* — QUALCOMM Incorporated

(57) ABSTRACT

In general, one aspect disclosed features a system comprising: a first user device configured to display virtual content, the first user device comprising one or more displays; one or more hardware processors; and a non-transitory machine-readable storage medium encoded with instructions executable by the one or more hardware processors to: generate a first image depicting virtual content in a virtual location corresponding to a physical location in a physical environment of the first user device, display the first image in the one or more displays of the first user device, enable a user of the first user device to create media and associate that media with the virtual content in the first image in the form of an annotation, and store the annotation and virtual content, and make it available for access by a plurality of additional user devices.

32 Claims, 14 Drawing Sheets

Related U.S. Application Data a continuation-in-part of application No. 17/023,228, filed on Sep. 16, 2020, now Pat. No. 11,756,225.

(51) Int. Cl.

| | |
|---|---|
| *G06F 16/58* | (2019.01) |
| *G06T 19/00* | (2011.01) |
| *H04L 12/18* | (2006.01) |

(52) U.S. Cl.
CPC ........ *G06T 19/00* (2013.01); *G06T 2219/004* (2013.01); *G06T 2219/024* (2013.01); *H04L 12/1813* (2013.01)

(56) References Cited

U.S. PATENT DOCUMENTS

| | | | |
|---|---|---|---|
| 10,403,047 | B1 | 9/2019 | Comer et al. |
| 11,176,756 | B1 | 11/2021 | Bar-Zeev et al. |
| 11,265,721 | B1 | 3/2022 | Satpathy |
| 11,275,946 | B1* | 3/2022 | Raz Goldfarb ......... H04L 51/10 |
| 11,587,295 | B2 | 2/2023 | Bar-Zeev et al. |
| 11,688,147 | B2 | 6/2023 | Bar-Zeev et al. |
| 11,710,284 | B2 | 7/2023 | Bar-Zeev et al. |
| 11,756,225 | B2 | 9/2023 | Bar-Zeev et al. |
| 11,847,752 | B2 | 12/2023 | Bar-Zeev et al. |
| 11,922,652 | B2 | 3/2024 | Bar-Zeev et al. |
| 2011/0090343 | A1 | 4/2011 | Alt et al. |
| 2012/0062595 | A1* | 3/2012 | Oh ....................... G06V 30/142 |
| | | | 345/633 |
| 2012/0210254 | A1 | 8/2012 | Fukuchi et al. |
| 2012/0249741 | A1 | 10/2012 | Maciocci et al. |
| 2013/0135348 | A1* | 5/2013 | Anzai ................... G06T 19/006 |
| | | | 345/633 |
| 2013/0201276 | A1 | 8/2013 | Pradeep et al. |
| 2013/0293468 | A1* | 11/2013 | Perez ...................... G06F 3/033 |
| | | | 345/158 |
| 2014/0111547 | A1 | 4/2014 | Bilbrey et al. |
| 2014/0267419 | A1 | 9/2014 | Ballard et al. |
| 2014/0375688 | A1 | 12/2014 | Redmann et al. |
| 2015/0062123 | A1 | 3/2015 | Yuen |
| 2015/0213650 | A1 | 7/2015 | Barzuza et al. |
| 2015/0234462 | A1 | 8/2015 | Miller et al. |
| 2015/0356788 | A1* | 12/2015 | Abe ...................... A63F 13/335 |
| | | | 345/633 |
| 2016/0012643 | A1 | 1/2016 | Kezele et al. |
| 2016/0171767 | A1 | 6/2016 | Anderson |
| 2016/0224103 | A1 | 8/2016 | Kochi |
| 2016/0259404 | A1 | 9/2016 | Woods |
| 2016/0292925 | A1 | 10/2016 | Montgomerie et al. |
| 2016/0358383 | A1* | 12/2016 | Gauglitz ............... G06F 3/0304 |
| 2017/0053621 | A1* | 2/2017 | Chen .................. G06F 3/04815 |
| 2017/0076499 | A1 | 3/2017 | Jiang et al. |
| 2017/0132806 | A1 | 5/2017 | Balachandreswaran |
| 2017/0163957 | A1 | 6/2017 | Anderson |
| 2017/0178272 | A1 | 6/2017 | Lashkari et al. |
| 2017/0186235 | A1 | 6/2017 | Chu |
| 2017/0186239 | A1* | 6/2017 | Hanai ................... G06F 1/1686 |
| 2017/0213473 | A1 | 7/2017 | Ribeira et al. |
| 2017/0287221 | A1* | 10/2017 | Ghaly ....................... G06T 7/70 |
| 2017/0316611 | A1 | 11/2017 | SanGiovanni et al. |
| 2017/0323488 | A1* | 11/2017 | Mott .................. G06Q 30/0643 |
| 2018/0158250 | A1* | 6/2018 | Yamamoto ............. G06T 19/20 |
| 2018/0289428 | A1 | 10/2018 | Lee et al. |
| 2018/0341811 | A1* | 11/2018 | Bendale .................... G06T 7/70 |
| 2019/0004684 | A1* | 1/2019 | Pahud .................... G06F 3/013 |
| 2019/0019337 | A1* | 1/2019 | Monsarrat ............... A63F 13/65 |
| 2019/0057620 | A1 | 2/2019 | Eggert et al. |
| 2019/0105568 | A1 | 4/2019 | Platt et al. |
| 2019/0108578 | A1 | 4/2019 | Spivack et al. |
| 2019/0130648 | A1 | 5/2019 | Duca et al. |
| 2019/0197770 | A1 | 6/2019 | Chang et al. |
| 2019/0205645 | A1* | 7/2019 | Bates .................... G06F 16/583 |
| 2019/0232500 | A1* | 8/2019 | Bennett ................. G06T 19/006 |
| 2019/0273916 | A1 | 9/2019 | Benishti et al. |
| 2019/0303594 | A1 | 10/2019 | Shimakawa et al. |
| 2019/0313059 | A1* | 10/2019 | Agarawala .............. G06F 3/011 |
| 2019/0318065 | A1* | 10/2019 | Brent .................... G06F 21/121 |
| 2019/0370544 | A1 | 12/2019 | Wright, Jr. et al. |
| 2020/0066054 | A1 | 2/2020 | Yin et al. |
| 2020/0098191 | A1 | 3/2020 | Mccall |
| 2020/0151961 | A1* | 5/2020 | Viner ...................... G06F 3/011 |
| 2020/0265228 | A1* | 8/2020 | Petluru .................. G06V 20/20 |
| 2020/0286222 | A1 | 9/2020 | Essenreiter et al. |
| 2020/0367970 | A1* | 11/2020 | Qiu ........................ A61B 90/36 |
| 2021/0166027 | A1 | 6/2021 | Handa |
| 2021/0209856 | A1 | 7/2021 | Liukkonen |
| 2021/0286427 | A1* | 9/2021 | Pateriya .................. G06F 3/013 |
| 2022/0079675 | A1 | 3/2022 | Lang |
| 2022/0139532 | A1* | 5/2022 | Fotouhighazvini .... A61B 6/466 |
| | | | 382/128 |
| 2023/0418369 | A1 | 12/2023 | Goldberg et al. |
| 2024/0202959 | A1 | 6/2024 | Bar-Zeev et al. |

OTHER PUBLICATIONS

Non-Final Office Action dated Sep. 16, 2022, issued in related U.S. Appl. No. 17/023,228 (15 pages).

Final Office Action dated Mar. 2, 2023, issued in related U.S. Appl. No. 17/023,228 (13 pages).

Notice of Allowance mailed Apr. 24, 2023, issued in related U.S. Appl. No. 17/023,228 (9 pages).

Non-Final Office Action dated May 19, 2021, issued in related U.S. Appl. No. 17/023,220 (58 pages).

Notice of Allowance dated Jul. 23, 2021, issued in related U.S. Appl. No. 17/023,220 (10 pages).

Notice of Allowance mailed Sep. 21, 2022, issued in related U.S. Appl. No. 17/494,256 (14 pages).

Non-Final Office Action dated Oct. 19, 2022, issued in related U.S. Appl. No. 17/551,020 (18 pages).

Non-Final Office Action dated Oct. 17, 2022, issued in related U.S. Appl. No. 17/551,009 (44 pages).

Non-Final Office Action dated May 30, 2023, issued in related U.S. Appl. No. 18/150,109 (12 pages).

PCT International Preliminary Report on Patentability mailed Mar. 30, 2023, issued in related International Application No. PCT/US2021/050742 (9 pages).

PCT International Preliminary Report on Patentability mailed Mar. 30, 2023, issued in related International Application No. PCT/US2021/050746 (5 pages).

Non-Final Office Action dated Aug. 30, 2023, issued in related U.S. Appl. No. 18/096,817 (12 pages).

Masaki Maeda et al., "Tracking of User Position and Orientation by Stereo Measurement of Infrared Markers and Orientation Sensing", IEEE Proceedings of the Eighth International Symposium on Wearable Computers (ISWC '04), 2004.

International Search Report and Written Opinion in PCT/US2021/050742, mailed Jan. 19, 2022.

International Search Report and Written Opinion in PCT/US2021/050746, mailed Oct. 15, 2021.

Supplementary European Search Report—EP21870248—Search Authority—Munich—Sep. 30, 2024.

Irlitti A., et al., "Challenges for Asynchronous Collaboration in Augmented Reality", 2016 IEEE International Symposium on Mixed and Augmented Reality Adjunct Proceedings, Sep. 19-23, 2016, pp. 31-35.

Supplementary European Search Report—EP22893765—Search Authority—Munich—Jul. 30, 2025.

* cited by examiner

400

406

404

402

900

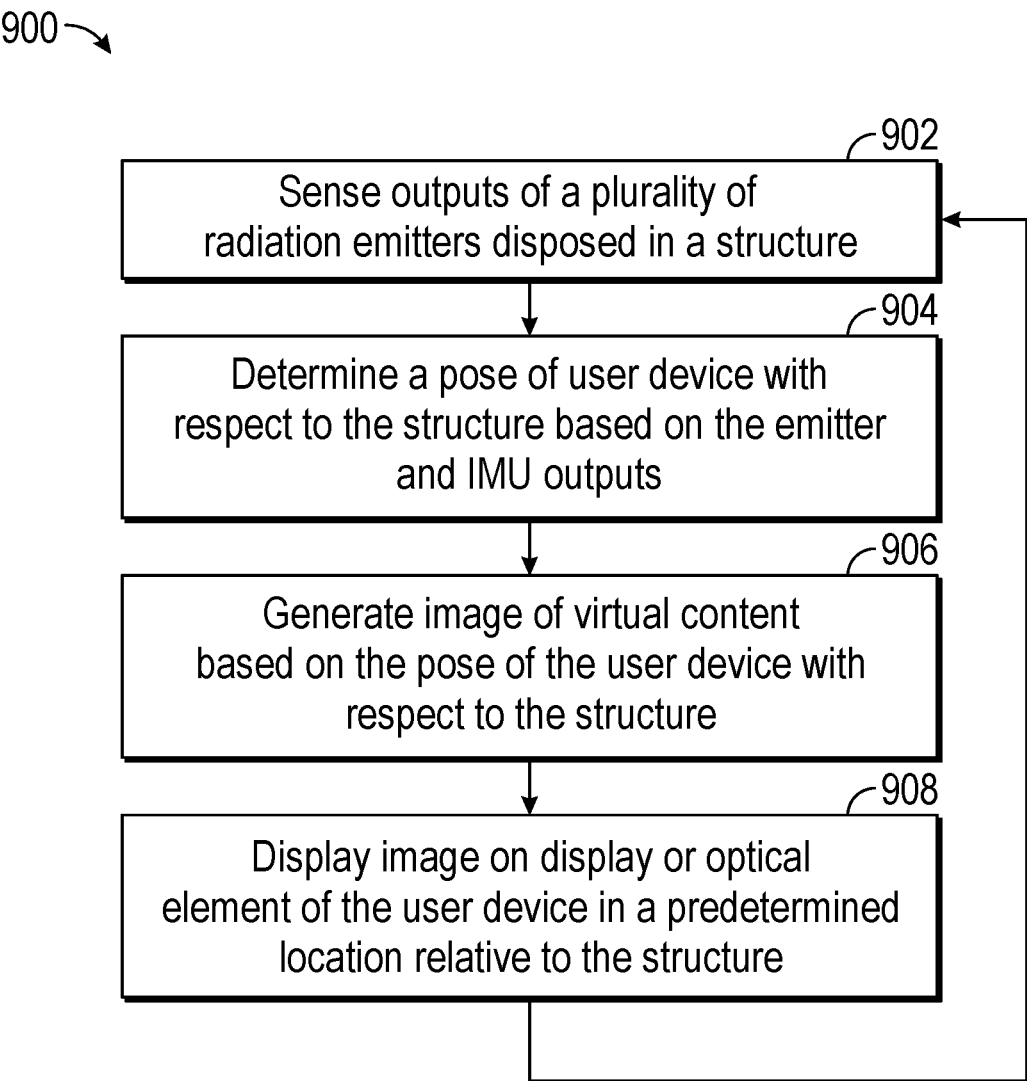

902

Sense outputs of a plurality of
radiation emitters disposed in a structure

904

Determine a pose of user device with
respect to the structure based on the emitter
and IMU outputs

906

Generate image of virtual content
based on the pose of the user device with
respect to the structure

908

Display image on display or optical
element of the user device in a predetermined
location relative to the structure

FIG. 9

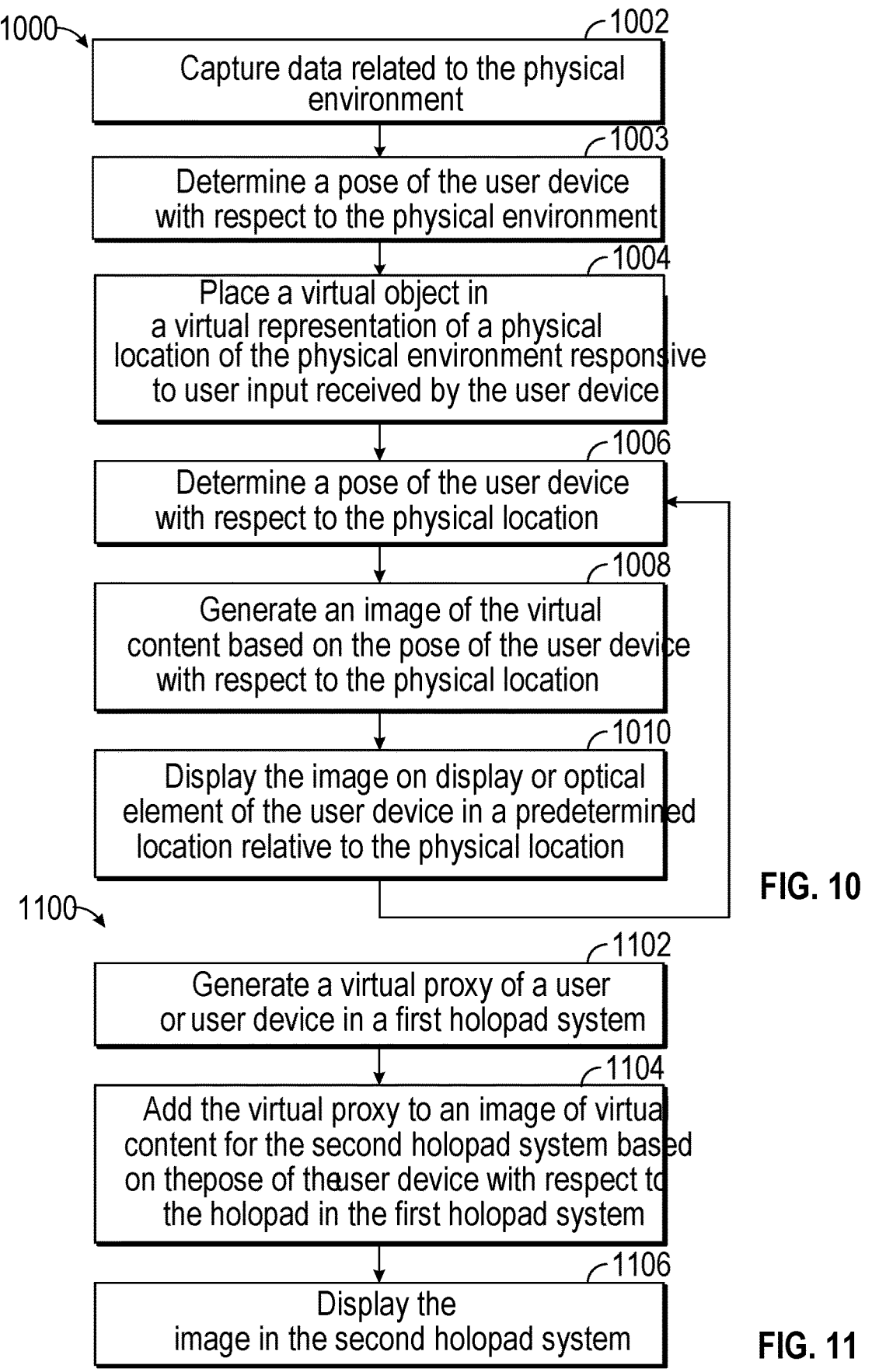

1000

1002
Capture data related to the physical environment

1003
Determine a pose of the user device with respect to the physical environment 1004
Place a virtual object in a virtual representation of a physical location of the physical environment responsive to user input received by the user device 1006
Determine a pose of the user device with respect to the physical location 1008
Generate an image of the virtual content based on the pose of the user device with respect to the physical location 1010
Display the image on display or optical element of the user device in a predetermined location relative to the physical location

1102
Generate a virtual proxy of a user or user device in a first holopad system 1104
Add the virtual proxy to an image of virtual content for the second holopad system based on the pose of the user device with respect to the holopad in the first holopad system 1106
Display the image in the second holopad system

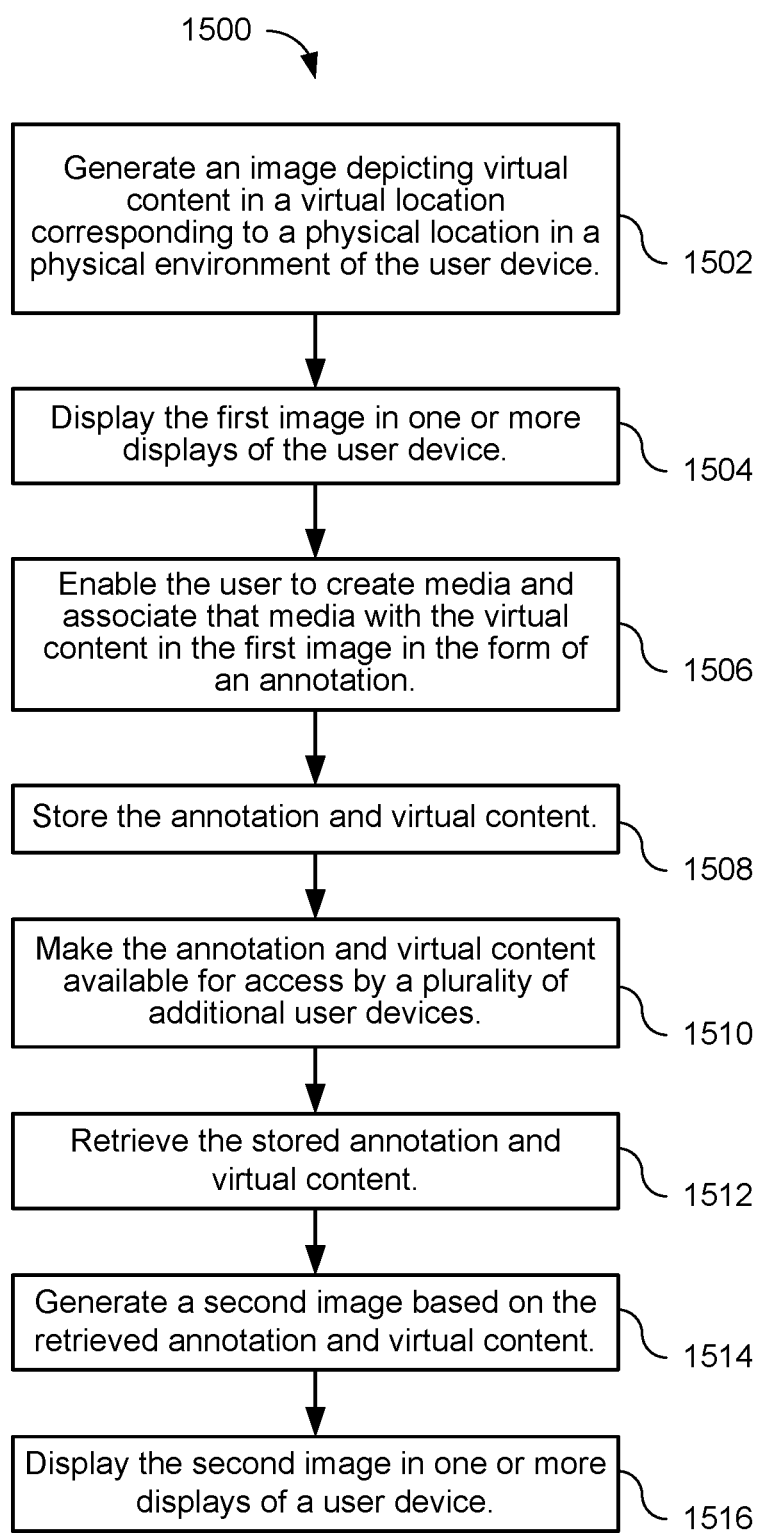

Generate an image depicting virtual content in a virtual location corresponding to a physical location in a physical environment of the user device. — 1502

Display the first image in one or more displays of the user device. — 1504

Enable the user to create media and associate that media with the virtual content in the first image in the form of an annotation. — 1506

Store the annotation and virtual content. — 1508

Make the annotation and virtual content available for access by a plurality of additional user devices. — 1510

Retrieve the stored annotation and virtual content. — 1512

Generate a second image based on the retrieved annotation and virtual content. — 1514

Display the second image in one or more displays of a user device. — 1516

Processor(s) 1604

Network Interface(s) 1618

Bus 1602

Main Memory 1606

ROM 1608

Storage 1610

Display 1612

Input Device(S) 1614

Cursor Control 1616

AUGMENTED REALITY COLLABORATION SYSTEM WITH ANNOTATION CAPABILITY

CROSS REFERENCE TO RELATED APPLICATIONS

The present application is a continuation-in-part of U.S. patent application Ser. No. 17/023,220, filed Sep. 16, 2020, entitled "AUGMENTED REALITY COLLABORATION SYSTEM," the disclosure thereof incorporated by reference herein in its entirety.

The present application is a continuation-in-part of U.S. patent application Ser. No. 17/023,228, filed Sep. 16, 2020, entitled "AUGMENTED REALITY COLLABORATION SYSTEM," the disclosure thereof incorporated by reference herein in its entirety.

DESCRIPTION OF RELATED ART

The disclosed technology relates generally to augmented reality systems, and more particularly, some embodiments relate to collaboration using such systems.

SUMMARY

A claimed solution rooted in computer technology overcomes problems specifically arising in the realm of computer technology.

In general, one aspect disclosed features a system comprising: a first user device configured to display virtual content, the first user device comprising one or more displays; one or more hardware processors; and a non-transitory machine-readable storage medium encoded with instructions executable by the one or more hardware processors to: generate a first image depicting virtual content in a virtual location corresponding to a physical location in a physical environment of the first user device, display the first image in the one or more displays of the first user device, enable a user of the first user device to create media and associate that media with the virtual content in the first image in the form of an annotation, and store the annotation and virtual content, and make it available for access by a plurality of additional user devices.

Embodiments of the system may include one or more of the following features. In some embodiments, the media is generated by the user through the use of a second user device. In some embodiments, the second user device is a handheld device. In some embodiments, the second user device executes a first application that is communicably linked to a second application on which the first image is being generated. In some embodiments, the first user device is a head-mounted device. In some embodiments, wherein the instructions are further executable by the one or more hardware processors to: determine a pose of the first user device with respect to the physical location; and generate the first image based on the pose. In some embodiments, the instructions are further executable by the one or more hardware processors to: hold the first image in the one or more displays of the first user device as the pose of the first user device changes while adding the annotation to the image. In some embodiments, the instructions are further executable by the one or more hardware processors to: store a view of the annotation and virtual content according to the pose. In some embodiments, at least one of the plurality of additional user devices is configured to: retrieve the stored view of the annotation and virtual content; generate a second image based on the view; and display the second image in one or more displays of the additional user device. In some embodiments, the first and second images are displayed synchronously. In some embodiments, the first and second images are displayed asynchronously. In some embodiments, the additional user device is proximate to the first user device. In some embodiments, the additional user device is remote from the first user device. In some embodiments, the additional user device is configured to enable its user to create a second media and associate that second media with the annotation. In some embodiments, the media comprises at least one of: text; an image; a video segment; or an audio segment.

In general, one aspect disclosed features non-transitory machine-readable storage medium encoded with instructions executable by one or more hardware processors to: generate a first image depicting virtual content in a virtual location corresponding to a physical location in a physical environment of the first user device; display the first image in the one or more displays of a first user device; enable a user of the first user device to create media and associate that media with the virtual content in the first image in the form of an annotation; and store the annotation and virtual content, and make it available for access by a plurality of additional user devices.

Embodiments of the medium may include one or more of the following features. In some embodiments, the media is generated by the user through the use of a second user device. In some embodiments, the second user device is a handheld device. In some embodiments, the second user device executes a first application that is communicably linked to a second application on which the first image is being generated. In some embodiments, the first user device is a head-mounted device. In some embodiments, the instructions are further executable by the one or more hardware processors to: determine a pose of the first user device with respect to the physical location; and generate the first image based on the pose. In some embodiments, the instructions are further executable by the one or more hardware processors to: hold the first image in the one or more displays of the first user device as the pose of the first user device changes while adding the annotation to the image. In some embodiments, the instructions are further executable by the one or more hardware processors to: store a view of the annotation and virtual content according to the pose. In some embodiments, at least one of the plurality of additional user devices is configured to: retrieve the stored view of the annotation and virtual content; generate a second image based on the view; and display the second image in one or more displays of the additional user device. In some embodiments, the first and second images are displayed synchronously. In some embodiments, the first and second images are displayed asynchronously. In some embodiments, the additional user device is proximate to the first user device. In some embodiments, the additional user device is remote from the first user device. In some embodiments, the additional user device is configured to enable its user to create a second media and associate that second media with the annotation. In some embodiments, the media comprises at least one of: text; an image; a video segment; or an audio segment.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 9 is a flowchart of a process of a physical holopad system according to some embodiments of the disclosed technology.

FIG. 10 is a flowchart of a process of a virtual holopad system according to some embodiments of the disclosed technology.

FIG. 11 is a flowchart for a process for providing, to a second holopad system user, a virtual proxy of a user in a first holopad system, according to embodiments of the disclosed technology.

FIG. 15 is a flowchart of a process of a physical holopad system according to some embodiments of the disclosed technology.

Figure 1:
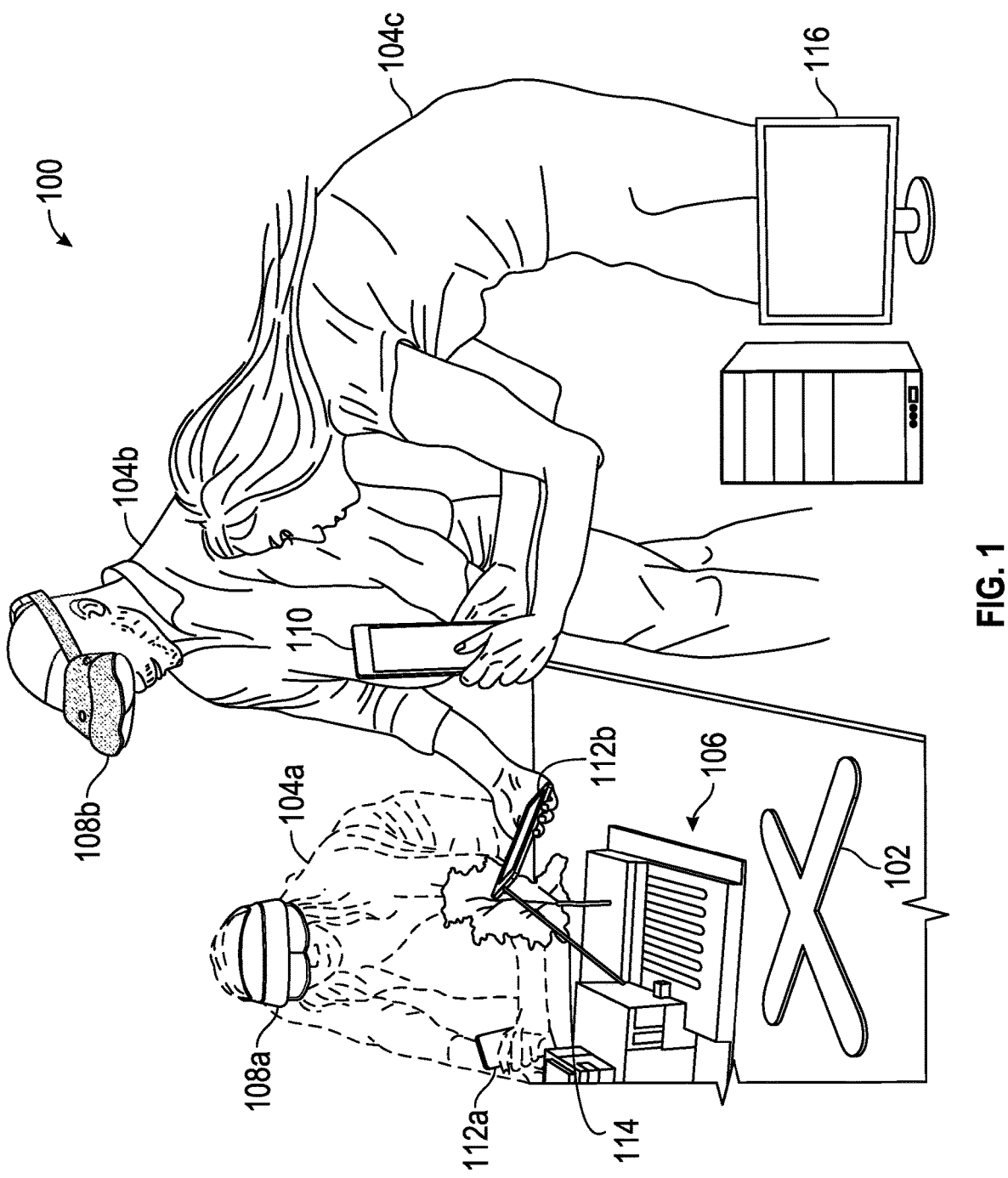
FIG. 1 illustrates an augmented reality collaboration system featuring a physical holopad according to some embodiments of the disclosed technology.

The figures are not exhaustive and do not limit the present disclosure to the precise form disclosed.

DETAILED DESCRIPTION

With continued advances in computing and networking technology, computer systems are providing better ways for people to collaborate virtually while collocated or in remote locations. At the same time, augmented reality systems are providing better ways for people to view and modify three-dimensional content. However, attempts to combine these systems have proven unsuccessful. Current systems fail to deliver sufficient visual quality, generally providing both low image quality and an insufficient field of view. These systems also generally lack an ability to provide close-up views, and don't accommodate users wearing eyeglasses. And these systems don't allow users to see each other's eyes, further diminishing the collaborative experience.

Furthermore, these systems provide insufficient input and control features for users. Current systems are generally complex and ergonomically challenging, for example making text entry difficult, and confronting new users with a steep learning curve. In addition, current systems require extensive preparation for use. For example, many of these systems require data preparation, software development, gesture recognition technologies, and/or time-consuming room and surface scans—and the computing power to perform all of these functions, often simultaneously—before and during each use. Finally, many of these systems are incompatible with current collaboration systems such as existing collaborative meeting solutions.

Rising to these challenges, some embodiments of the disclosed technology provide augmented reality collaboration systems featuring physical devices that designate a projection location for virtual content displayed by the collaboration system, also referred to herein as physical "holopads." In these embodiments, images of virtual content are displayed to the users in a predetermined location relative to the physical holopad, such that the virtual content resembles a hologram projected by the holopad. The users may view and interact with virtual content using a variety of user devices, including headsets, tablets, smartphones, controllers, gestures and gesture recognition coupled with virtual control systems, and the like. Each physical holopad not only provides position and orientation information for the system, but also serves as an intuitive physical point of reference for the users. While conventional two-dimensional collaboration systems make it clear where virtual content will appear, shared holographic experiences can appear anywhere, and therefore don't make it clear to users where to look. With the disclosed holopads, the disclosed technology acts as a shared 3D monitor, making it clear to users of the collaboration system where virtual content will appear, thus facilitating the purpose and effectiveness of the system. In some embodiments, the disclosed technology permits 3D videoconferencing, with a holopad at each location. These embodiments enable geographically-distributed users to feel as though they are all collaborating around the same table.

In some embodiments, each physical holopad may be a structure that includes a plurality of radiation emitters, for example such as infrared emitters, arranged in a known pattern. The holopad may be placed in a central location about which users may gather in a single location, for example such as a conference room table. Sensors on each user device may detect emissions from the emitters to determine the pose of the headset with respect to the holopad. As used herein, the "pose" of an object represents its spatial relationship with another object, including position and orientation.

In other embodiments, sensors on a user device may determine the pose of the headset with respect to the physical holopad using object or image recognition technologies. In such embodiments, the physical holopad need not include radiation emitters.

In any embodiment, determining a pose may include processing outputs of inertial monitoring units (IMUs) in the user devices. For example, a user device that takes the form of a headset may include an IMU. Sensors such as cameras typically allow position fixes at relatively low frequencies of around 60 Hz. Conversely, IMUs may provide position changes at a very high rate, for example at a frequency of 200 Hz or higher. The fusion of these two technologies and their relative outputs allows the collaboration system to achieve highly-accurate position fixes, while also allowing it to make highly-accurate predictions of the user's future positions.

The system may generate an image of the virtual content for each user device based on its pose with respect to the physical holopad. The user devices may display the images in a predetermined location relative to the physical holopad. For example, the virtual content may appear to the users to hover above the holopad as though the holopad were projecting a hologram of the virtual content.

Some embodiments of the disclosed technology provide augmented reality collaboration systems featuring virtual holopads. In these embodiments, users may view and interact with virtual content using a variety of user devices, including headsets, tablets, smartphones, and the like, without the use of a physical holopad. Instead of placing a physical structure on a surface, the user may employ the user device and surface tracking software (such as ARKit or ARCore) to place a virtual holopad on the surface. These embodiments are ideal for environments where a physical holopad may not be available or convenient, such as a hotel room. Like the physical holopad, the virtual holopad serves as a visual point of reference for the user as well as a means for aligning the coordinate system of the user's environment with that of remote systems that include a physical or virtual holopad. As with the physical holopad, the system generates an image of the virtual content for display on a user device in a predetermined location relative to the virtual holopad. For example, the virtual content may appear to the users to hover above the virtual holopad as though the virtual holopad were projecting a hologram of the virtual content. Regardless of user location and whether a physical or virtual holopad is being used, all users see the virtual content in the same position relative to the holopad, thereby thus creating the perception of the system as presenting a shared 3D/holographic monitor.

In some embodiments, one or more of the disclosed augmented reality systems may be interconnected to share virtual content for communication or collaboration. For example, the interconnected systems may be networked, and may include one or more of the physical holopad systems and one or more of the virtual holopad systems. In such embodiments, each user may have one or more permissions. For example, the permissions may include permissions to view or edit the virtual content. The users may change permissions during the collaboration, according to user input and/or specific parameters that may be set on the system at the outset or during the collaboration session. Any of the systems may be remote from one or more other systems. Any of the virtual holopad systems may be collocated with other virtual or physical holopad systems.

FIG. 1 illustrates an augmented reality collaboration system 100 featuring a physical holopad according to some embodiments of the disclosed technology. Referring to FIG. 1, the system 100 includes a physical holopad 102 and a plurality of user devices employed by three users 104a,b,c to view and interact with virtual content 106, which in this example represents a building. In this example, users 104a,b employ headsets 108a,b to view the virtual content 106, while user 104c employs a tablet 110 to view the virtual content 106.

In the example of FIG. 1, users 104b,c are local, and are physically present in the same room as the holopad 102, and user 104a is remote, in another location, as indicated by broken lines. A virtual proxy of the remote user 104a may be displayed to the local users 104b,c as part of the virtual content 106, for example as described below in detail. In the example of FIG. 1, the virtual proxy represent the headset 108a of the remote user 104a.

As noted above, the pose of each user device with respect to the physical holopad 102 may be determined by sensing emitters on the holopad, or by object or image recognition. To facilitate use of the emitters, the tablet 110 may include sensors, or may be equipped with an add-on device that includes the sensors, for example as described below.

The system may include one or more computer systems 116 each featuring a memory and one or more processors executing instructions stored in the memory to generate images of the virtual content 106 for display to the users 104 on the user devices, which may be tethered to the computer systems 116 for power and communications. For example, the headsets may be tethered to the computer system, while the mobile devices may run on their own batteries and compute power. In some embodiments, some or all of this processing may take place at the user devices, which may be battery-powered and contain any and all processors and communication equipment needed to function in the collaboration system. In some embodiments, the user devices may have wired connections to the computer, for example to provide high image quality, compute power, and/or electrical power. In some embodiments, the user devices may have wireless connections to the computer, such as Bluetooth, WiFi, and the like, for example to allow increased mobility of the users 104.

The users 104 may employ their user devices, or a peripheral device that is directly or indirectly connected to their user devices, to interact with the virtual content 106. For example, a smartphone may include an app that provides tools for interacting with the virtual content. In the example of FIG. 1, user 104b is shown using a smartphone 112b to interact with the content using a beam 114. In some embodiments, the beam 114 may be a virtual beam generated by the system and visible on the user devices. Interaction with the virtual content may include selection of the virtual content, modification of the virtual content, annotation of the virtual content, and the like.

In some embodiments, the other users 104a,c may also interact with the virtual content 106, either sequentially or concurrently. For example, user 104a may employ a smartphone 112a to interact with the virtual content 106, while user 104c may employ tablet 110. In some embodiments, the users 104a,b may employ their headsets 108a,b to interact with the virtual content 106. In such embodiments, the headsets may include user interfaces including tactile control, gaze control, voice command, and the like. As noted below, in gesture-controlled systems, the headsets 108 may include sensors for detecting the gestures.

Figure 2:
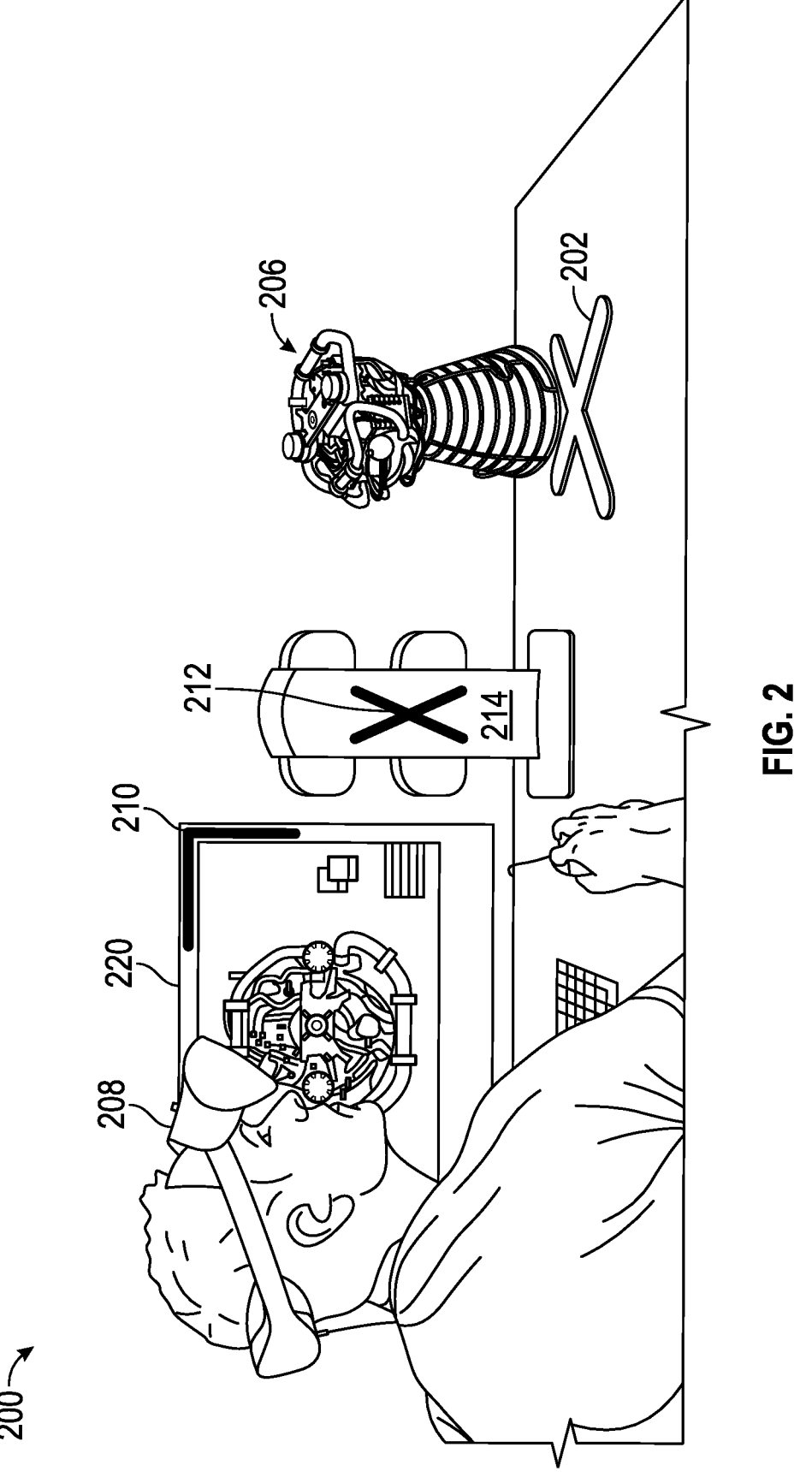
FIG. 2 illustrates the use of an augmented reality collaboration system featuring a physical holopad in conjunction with a computer-aided design (CAD) system according to some embodiments of the disclosed technology.

In some embodiments, the disclosed systems may be used in conjunction with other systems. For example, the systems may include applications for creating virtual content using 3D data from existing 3D tools such as computer-aided design (CAD) systems. FIG. 2 illustrates the use of an augmented reality collaboration system 200 featuring a physical holopad in conjunction with a CAD system according to some embodiments of the disclosed technology. Referring to FIG. 2, the system 200 includes a physical holopad 202 and a headset 208 for viewing virtual content 206, which in this example represents a rocket engine. In this example, the system 200 also includes a CAD system 220. The views generated by the CAD system 220 may be coordinated with the views of the virtual content 206. For example, manipulation of one view may affect both views, for example in real time.

While in FIG. 2 the physical holopad 202 is shown as a standalone unit, the disclosed physical holopads may take any physical form, and may be attached to, or integrated with, one or more physical objects. In FIG. 2, three examples are shown. The physical holopad 202 is a cruciform design. A physical holopad 210 is attached to, or integrated with, the frame of a computer monitor. A physical holopad 212 is attached to, or integrated with, a stand 214 for holding the headsets 208.

Figure 3:
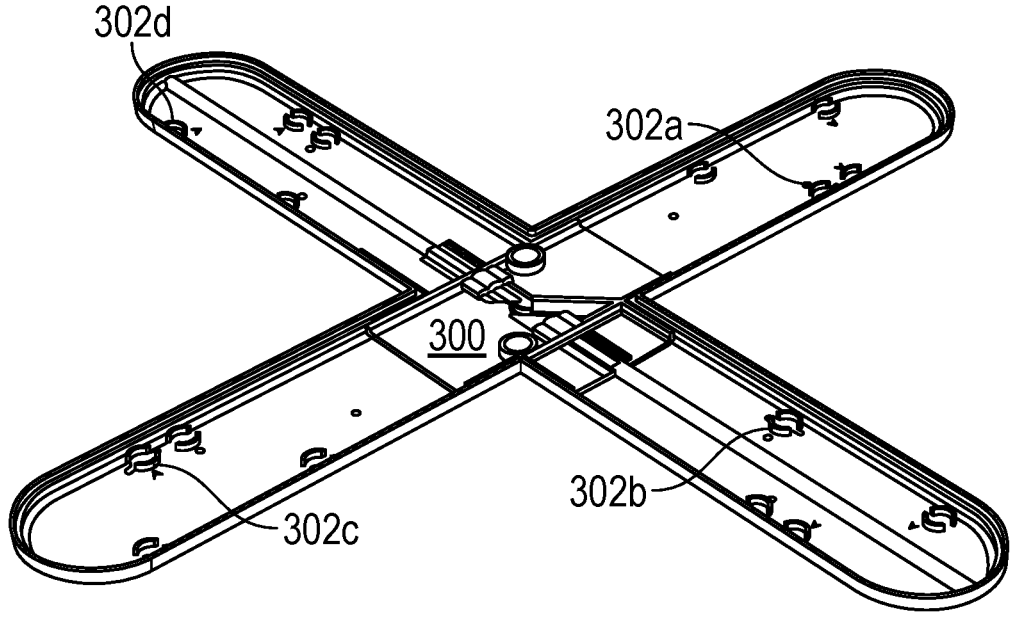
FIG. 3 is a perspective view of the interior of a physical holopad according to some embodiments of the disclosed technology.

FIG. 3 is a perspective view of the interior of a physical holopad 300 according to some embodiments of the disclosed technology. In these embodiments, the holopad has a cruciform design and four radiation emitters 302*a,b,c,d* disposed within respective arms of the physical holopad 300. However, as noted above, the disclosed physical holopads may take any physical shape. In some embodiments, the emitters 302 are arranged in a predetermined pattern that is known to the system. These arrangements facilitate determining poses of the user devices with respect to the physical holopad 300.

Figure 4:
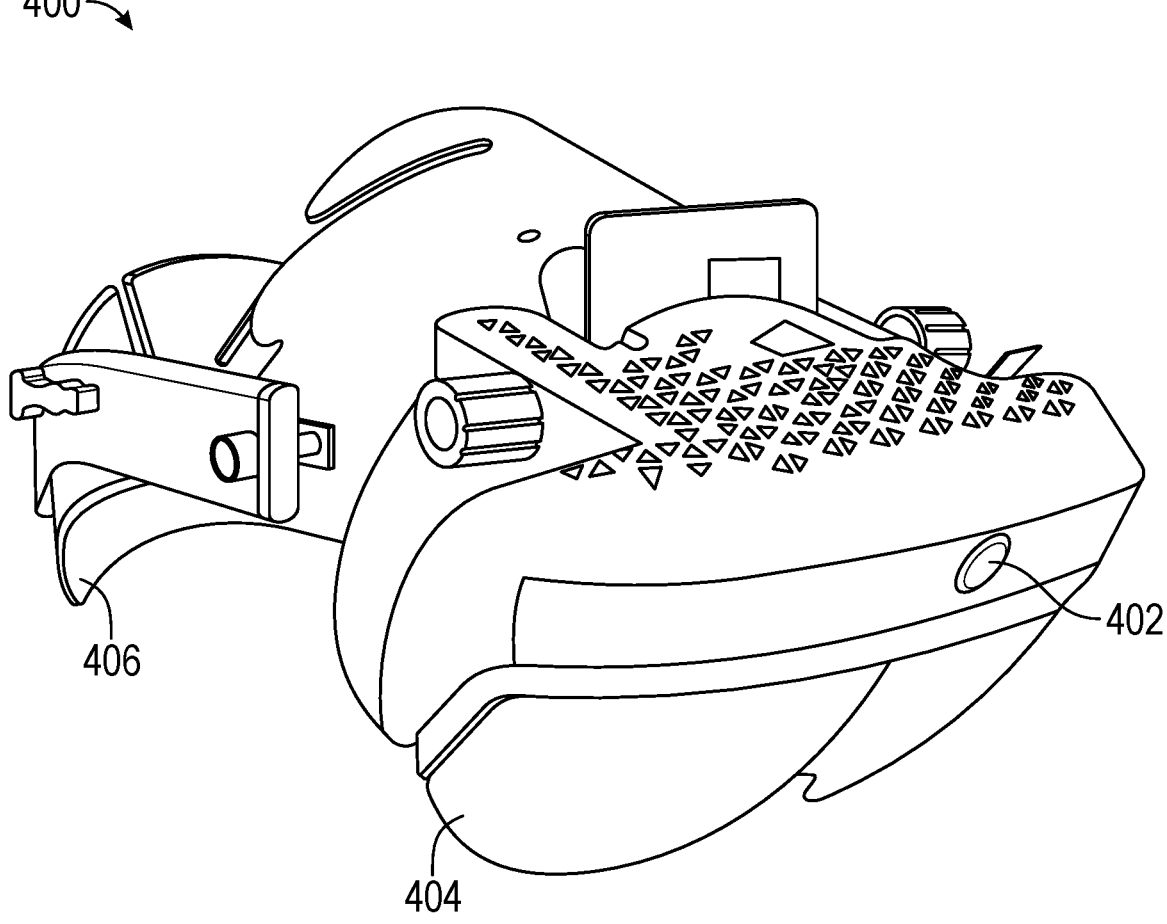
FIG. 4 is a perspective view of a headset according to some embodiments of the disclosed technology.

FIG. 4 is a perspective view of a headset 400 according to some embodiments of the disclosed technology. Referring to FIG. 4, the headset 400 may include a sensor 402 configured to capture emissions of the emitters of the physical holopads. For example, when the emitters are infrared emitters, the sensor 402 may include an infrared camera configured to capture images of the emitters.

The headset 400 may include one or more optical elements. The optical element(s) may be implemented as any reflective translucent optic, for example as shown at 404. For example, the optical element(s) 404 may be implemented as an off-axis optic, birdbath optic, prismatic optic, planar optic (i.e., a "waveguide"), or the like. In some of these embodiments, the optical elements are designed to permit other collocated users to see the eyes of the wearer. The translucent optic could be user replaceable with reflective opaque optic for a virtual reality experience.

In some embodiments, the optical element 404 may be replaced or augmented by a display to allow for passthrough augmented reality or virtual reality experiences. In such embodiments, the display may be a LCD, LED, OLED, or other display, that is positioned in the user device in front of the user's eyes. In such embodiments, the display facilitates viewing the image of the virtual content integrated with the physical environment. In some of these embodiments, the headset 400 includes a camera for capturing images of the physical environment, and these images are added to the images of virtual content so the wearer sees the virtual content integrated with the physical environment. In such embodiments, the front of the headset may be opaque.

The headset 400 may include a head attachment mechanism 406. The head attachment mechanism 406 may be implemented in any manner. For example, the head attachment mechanism 406 may be implemented as a headband or the like. In some embodiments, the optical element 404 is positioned so the headset 400 provides ample room to accommodate users wearing eyeglasses.

In some embodiments, the user device for viewing the virtual content may be implemented as a handheld computer, such as a smartphone, tablet, or the like. In some embodiments, these handheld user devices may include sensors capable of detecting the emitters of the physical holopad. In some embodiments, where the user devices may not be capable of such sensing, some embodiments may provide or be configured to accept an add-on device capable of performing the sensing.

Figure 5:
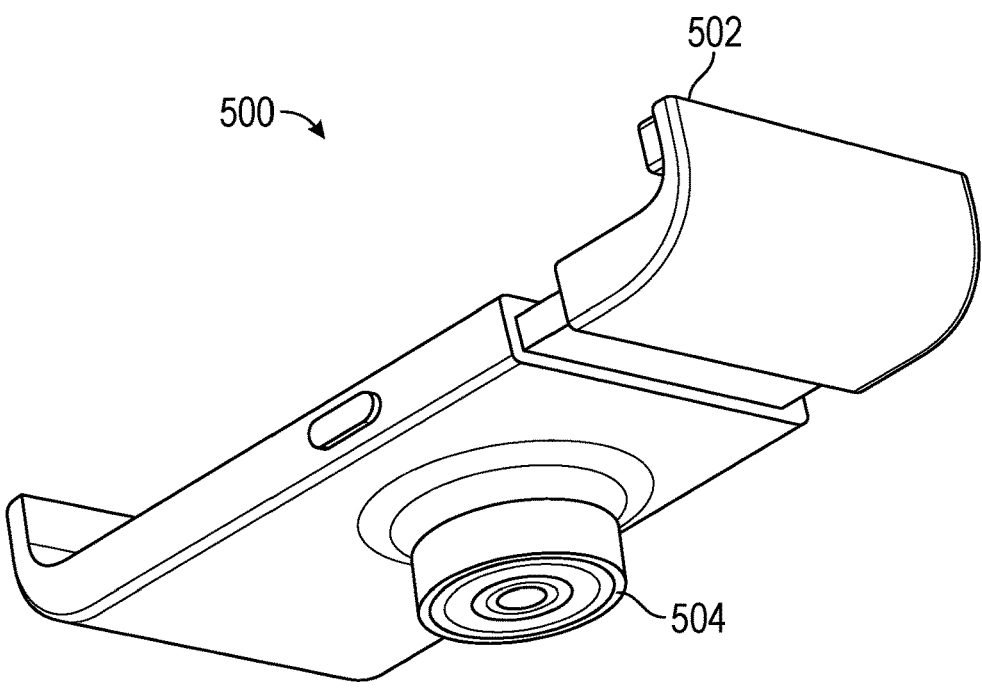
FIG. 5 is a perspective view of an add-on device according to some embodiments of the disclosed technology.

FIG. 5 is a perspective view of an add-on device 500 according to some embodiments of the disclosed technology. Referring to FIG. 5, the add-on device 500 may include an attachment device 502 configured to attach the add-on device 500 to a user device. In the example of FIG. 5, the attachment device 502 is implemented as a clamp. However, the attachment device 502 may attach to the user device in any manner.

Figure 6:
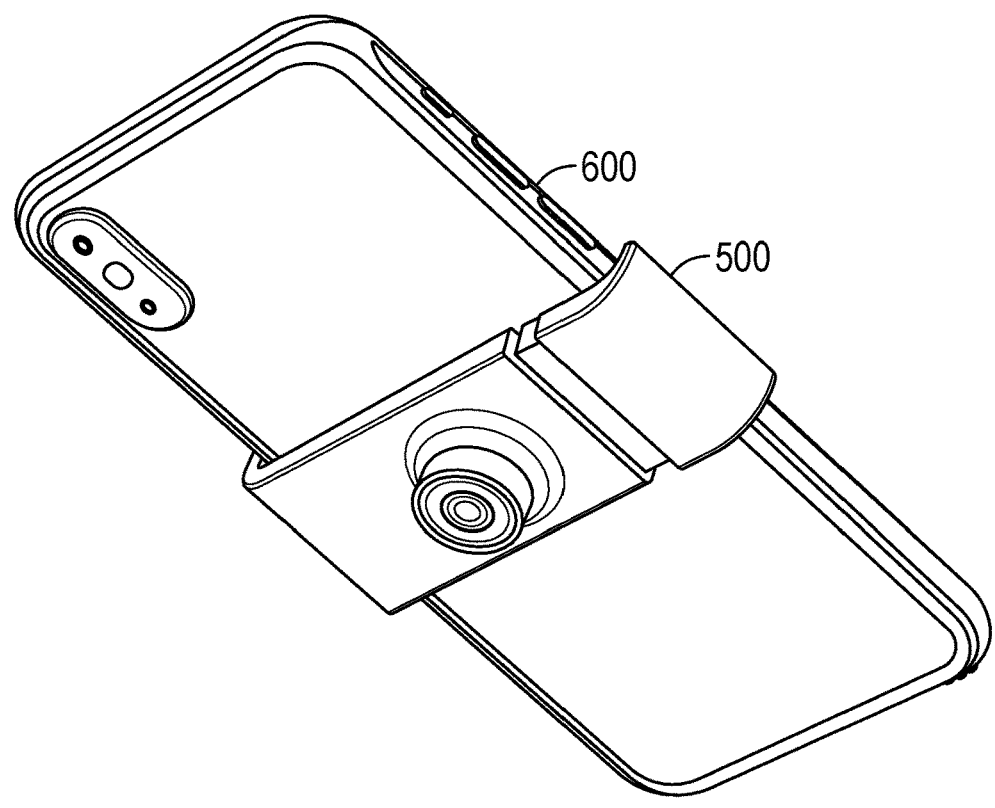
FIG. 6 is a perspective view of a user device with the add-on device attached according to some embodiments of the disclosed technology.

FIG. 6 is a perspective view of a user device 600 with the add-on device 500 attached according to some embodiments of the disclosed technology. In the example of FIG. 6, the user device is implemented as a smartphone. However, the user device 600 may be any device capable of performing the functions described herein.

In some embodiments, the add-on device 500 may be configured to communicate wirelessly with the user device 600. For example, the add-on device 500 may include a Bluetooth transceiver, NFC device, WiFi device, or the like. In some embodiments, the add-on device 500 may have a wired communication connection to the user device 600. For example, the add-on device 500 may have a connector configured to connect to a connector of the user device 600. In some embodiments, there is no wired or wireless communications connection directly between add-on device 500 and user device 600. Instead, the add-on device 500 may communicate to a computer network, to which user device 600 is also connected, for example via that user device's cellular or internet connection (e.g., via WiFi). In some embodiments, the add-on device 500 may include an NFC tag to pair the add-on device 500 and the user device 600 for direct communications. For example, a user may enter a conference room, pick up an add-on device 500, which pairs with the user device 600, identifies itself to the user device 600, which automatically opens up a controller app on the user device 600.

In some embodiments, the add-on device 500 may have a power source independent of the power source of the user device 600. In some embodiments, the add-on device 500 may be configured to draw power from the user device 600. In some embodiments, the add-on device 500 may be configured to provide power to the user device 600. All combinations of the described configurations are contemplated.

Figure 7:
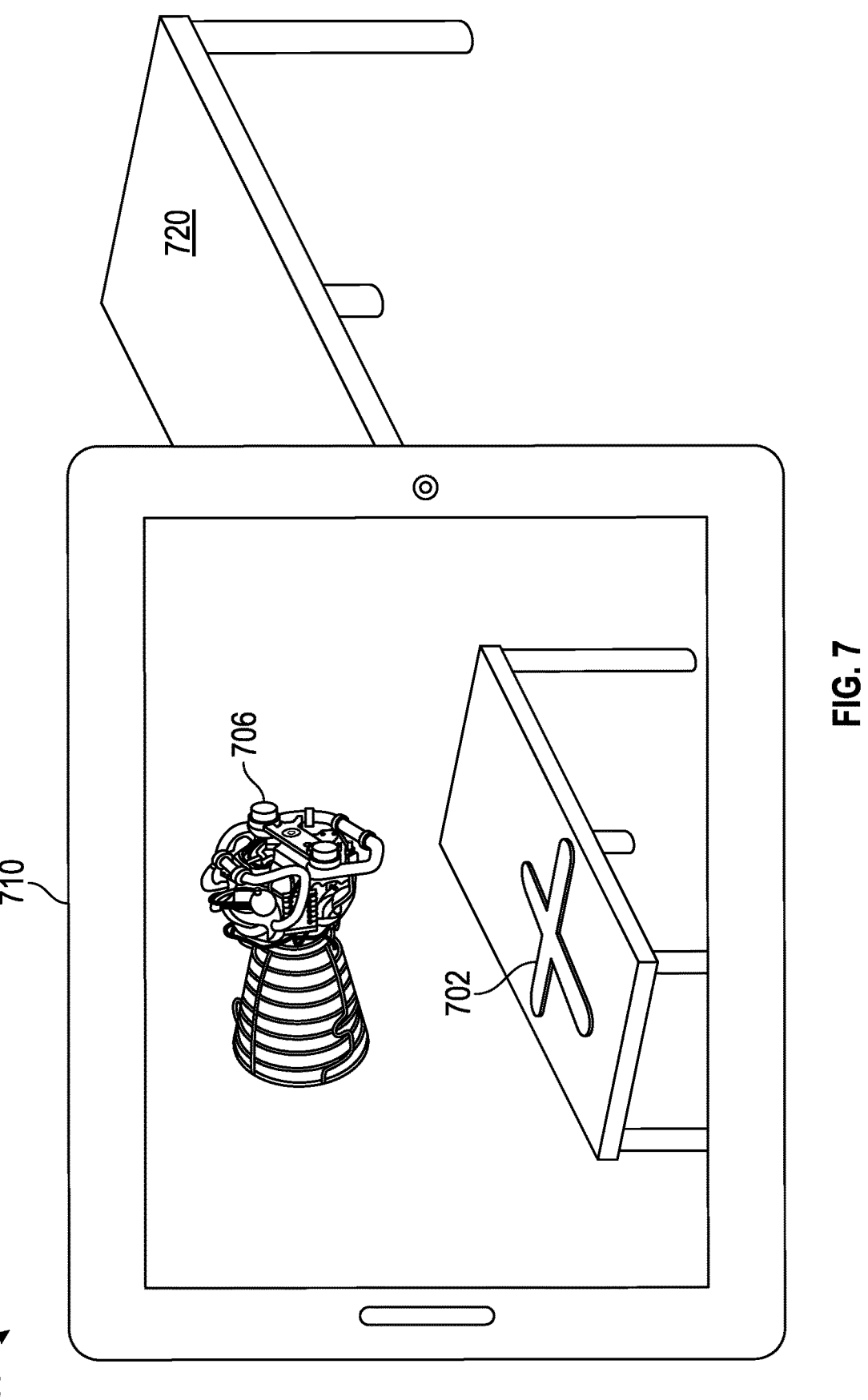
FIG. 7 illustrates an augmented reality collaboration system featuring a virtual holopad according to some embodiments of the disclosed technology.

FIG. 7 illustrates an augmented reality collaboration system 700 featuring a virtual holopad 702 according to some embodiments of the disclosed technology. Referring to FIG. 7, the system 700 includes a user device that a user can use to view and interact with virtual content 706, which in this example represents a rocket engine. In the example of FIG. 7, the user device is implemented as a tablet 710. However, the user device may be any device capable of performing the functions described herein. For example, the user device may be implemented as a headset, smartphone, laptop, and the like.

A user may employ the tablet 710 to place a virtual object in a 3D scene displayed by the tablet 710 in a virtual location that corresponds to a physical location in the user's physical environment. In this example, the user has placed the virtual holopad 702 in the virtual location corresponding to the surface of table 720. Of course, the user may place the virtual holopad 702 in virtual locations corresponding to other surfaces in the user's physical environment instead.

As with the physical holopad, the virtual holopad serves as a point of reference for the user. In some embodiments, the system may determine the pose of the tablet 710 with respect to the physical surface indicated by the virtual holopad 702. For example, an application executing on the tablet 710 may use one or more sensors to scan and track surfaces in the physical environment, and to determine the physical location indicated by the virtual holopad with respect to the tablet 710.

The system generates an image of the virtual content 706 and the virtual holopad 702 based on the pose of the tablet 710 with respect to the surface of table 720 selected by the user and enabled by surface tracking software implemented by the tablet 710. The tablet 710 may then display the image in a predetermined location relative to the virtual holopad 702. For example, the virtual content may appear to the user to hover above the virtual holopad as though the holopad were projecting a hologram of the virtual content. The image may include an image of the virtual holopad 702. The image may include an image of the physical environment, as shown in FIG. 7, where the image includes an image of the table 720.

Figure 8:
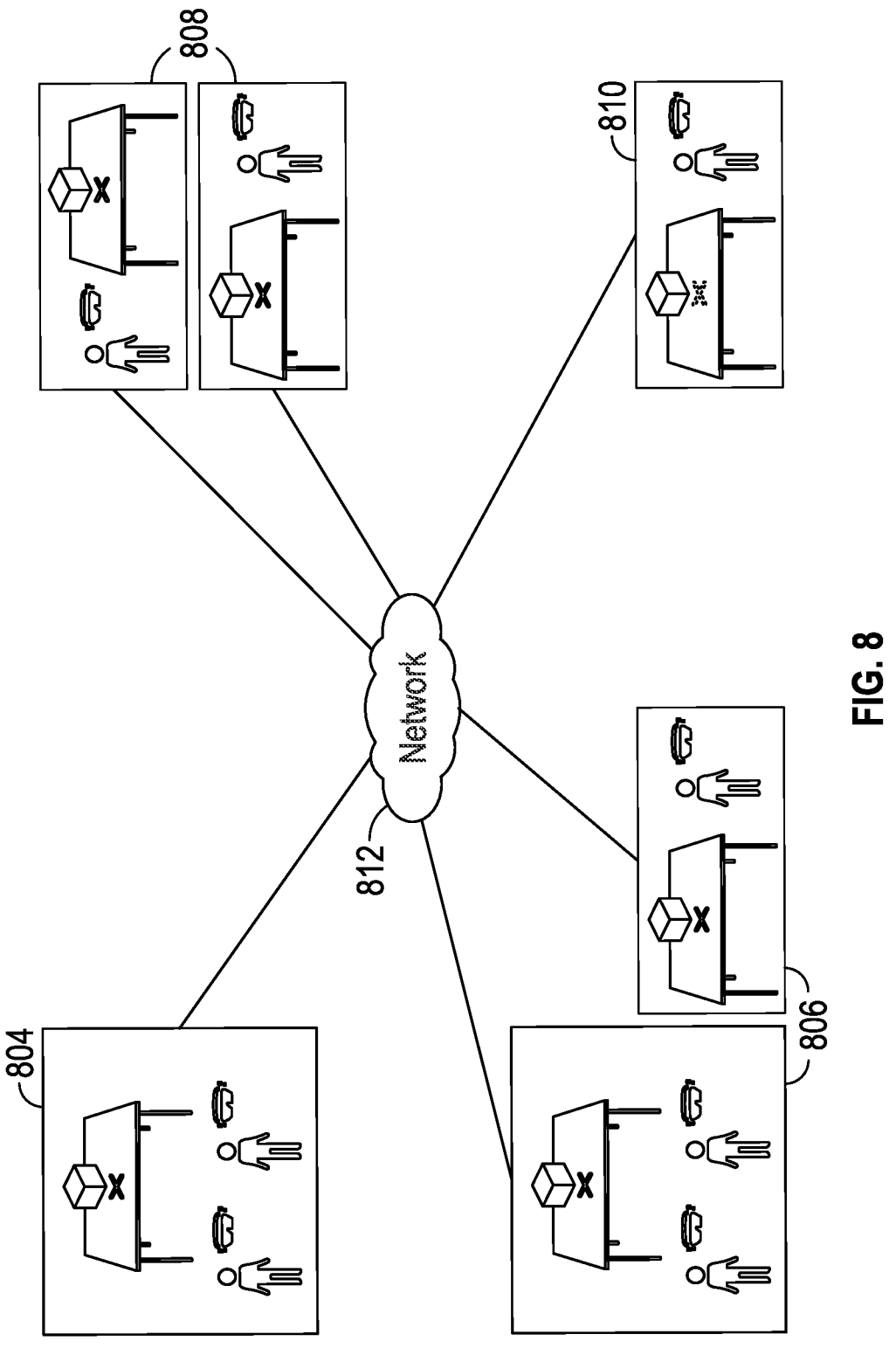
FIG. 8 illustrates some example networked systems according to embodiments of the disclosed technology.

FIG. 8 illustrates some example networked systems according to embodiments of the disclosed technology. One or more of the systems may include a wireless router to connect one or more components of the system. The wireless router may employ any wireless technology, for example including WiGig, WiFi6, 5G mmWave, and the like.

Several example system configurations are shown, interconnected by a network 812. However, it should be appreciated that other system configurations may be employed and interconnected in any number. While the user devices are illustrated as headsets, any sort of user device may be employed. A configuration including two users and a physical holopad in one room is shown at 804. In configuration 804, both users are viewing the same virtual content. A configuration including two users and a first physical holopad in one room, and one user and a second physical holopad in a second room, is shown at 806. In configuration 806, all three users are viewing the same virtual content. A configuration including one user and a first physical holopad in one room, and one user and a second physical holopad in a second room, is shown at 808. In configuration 808, both users are viewing the same virtual content. A configuration including one user and a virtual holopad, indicated by a broken line, in one room is shown at 810.

FIG. 9 is a flowchart of a process 900 of a physical holopad system according to some embodiments of the disclosed technology. For example, the process 900 may be performed by the physical holopad system 100 of FIG. 1. For clarity, the process 900 is described for one user device. However, the process 900 may be performed for each user device in a physical holopad system.

Referring to FIG. 9, the process 900 may include sensing outputs of a plurality of radiation emitters disposed in a structure, at 902. In the example of FIG. 1, each of the headsets 108 may include one or more sensors, for example such as the sensor 402 of FIG. 4. In gesture-controlled systems, the headsets 108 may include additional sensors for detecting the gestures. Each user device may include a sensor, for example integrated in the user device or as part of an add-on device such as the add-on device 500 of FIG. 5. The emitters may be infrared emitters, and the sensor may be an infrared camera that captures an image of the infrared emitters.

Referring again to FIG. 9, the process 900 may include determining a pose of the user device with respect to the structure based on the sensed outputs of the radiation emitters and outputs of the IMU, at 904. Continuing with the example of FIG. 1, the computer system(s) 116 may determine a pose of the user device 108 with respect to the physical holopad 102.

Referring again to FIG. 9, the process 900 may include generating an image of virtual content based on the pose of the user device with respect to the structure, at 906. Continuing with the example of FIG. 1, the computer system(s) 116 may generate an image of the virtual content 106 for the user device 108 based on the pose of the user device 108 with respect to the holopad 102.

Each user device may have a different pose with respect to the holopad 102. Therefore each image may be different, and may present the virtual content as viewed from the respective pose. The system may fix the orientation of the virtual content with respect to the holopad 102, and may update the images frequently. For example, the images may be refreshed at a high rate using complex algorithms such as fused camera and inertial sensors with prediction based on head motion models. Therefore, the virtual content may appear to remain stationary, so that the users may move about the room to view the virtual content from different perspectives.

For user devices that permit stereoscopic viewing, the system may generate a pair of images. Such user devices may display the pair of images concurrently as a stereoscopic image of the virtual content.

Referring again to FIG. 9, the process 900 may include displaying an image on an optical element of the user device in a predetermined location relative to the structure, at 908. Continuing the example of FIG. 1, the computer system(s) 116 may transmit the image to the user device, and responsive to receiving the image, the user device may display the image on its display or optical element. The process 900 may repeat, providing a seamless viewing experience to the user.

FIG. 10 is a flowchart of a process 1000 of a virtual holopad system according to some embodiments of the disclosed technology. For example, the process 1000 may be performed by the virtual holopad system 700 of FIG. 7. For clarity, the process 1000 is described for one user device. However, the process 1000 may be performed for each user device in the virtual holopad system.

Referring to FIG. 10, the process 1000 may include capturing data related to the physical environment, at 1002. In the example of FIG. 7, the tablet 710 may include a sensor for capturing the image. The sensor may be implemented as a camera, depth sensor, or the like, or combinations thereof.

Referring again to FIG. 10, In the example of FIG. 7, the tablet 710 may include a sensor for capturing the image. The sensor may be implemented as a camera, depth sensor, or the like, or combinations thereof.

Referring again to FIG. 10, the process 1000 may include determining a pose of the user device with respect to the physical environment, at 1003, and placing a virtual object in a 3D scene displayed by the user device in a virtual location that corresponds to a physical location in the physical environment responsive to user input received by the user device, at 1004. Continuing with the example of FIG. 7, a user may employ the tablet 710 to place the virtual holopad 702 on the table 720. The virtual holopad 702 then appears to remain in that location even as the tablet 710 is moved about by the user.

Referring again to FIG. 10, the process 1000 may include determining a pose of the user device with respect to the physical location of the placed virtual object, at 1006. Continuing with the example of FIG. 7, the tablet 710 may determine a pose of the tablet 710 with respect to the virtual holopad 702. That is, the tablet 710 may determine a pose of the tablet 710 with respect to the physical location on the table 720 where the virtual holopad 702 has been placed in the virtual environment. This pose may be determined in any suitable manner. For example, the pose may be determined by a commercially-available application such as ARKit or ARCore, which creates a virtual map of the surfaces and other notable physical characteristics of the user's physical environment that the application is programmed to recognize.

Referring again to FIG. 10, the process 1000 may include generating an image of virtual content based on the pose of the user device with respect to the physical location of the virtual object, at 1008. Continuing with the example of FIG. 7, the tablet 710 may generate an image of the virtual content 706 for the user based on the pose of the tablet 710 with respect to the physical location that corresponds to the user's placement of the virtual holopad. The image presents the virtual content 706 as viewed from that pose. The system may fix the orientation of the virtual content with respect to the virtual holopad 702, and may update the images frequently. Therefore, the virtual content appears to remain stationary, so that the user may move about the room to view the virtual content from different perspectives.

For user devices that permit stereoscopic viewing, the system may generate a pair of images. Such user devices may display the pair of images concurrently as a stereoscopic image of the virtual content.

Referring again to FIG. 10, the process 1000 may include displaying an image on a display or optical element of the user device in a predetermined location relative to the physical location of the placed virtual object, at 1010. Continuing the example of FIG. 7, the image may be displayed on the tablet 710 as illustrated in FIG. 7. In other embodiments, the image may be displayed on other user devices such as headsets, smartphones, laptops, and the like. The process 1000 may repeat, providing a seamless viewing experience to the user.

In some embodiments, users may share their images of the virtual content with other users. For example, while explaining a particular view of the virtual content, a presenter may share the presenter's view of the virtual content so other users see the same view.

In some embodiments, each networked system may include, in images provided to its local users, representations of users and/or user devices in other systems. These representations, referred to herein as "virtual proxies," may take any form. For example, a virtual proxy of a user may represent only the user devices currently employed by that user. However, the virtual proxies may be represented in any way. In some embodiments, movements of the users may be tracked to provide more realistic virtual proxies. For example, the systems may track movement of a user's head, hand, body, eyes, and the like.

FIG. 11 is a flowchart for a process 1100 for providing, to a second holopad system user, a virtual proxy of a user in a first holopad system, according to embodiments of the disclosed technology. Either of the first and second holopad systems may be a virtual holopad system or a physical holopad system.

Referring to FIG. 11, the process 1100 may include generating a virtual proxy of a user device in the physical holopad system, at 1102. The virtual proxy may include one or more three-dimensional objects. The virtual proxy may represent one or more user devices, the user, a control device being used by the user, or any combination thereof.

Referring again to FIG. 11, the process 1100 may include adding the virtual proxy to an image of virtual content for the second holopad system, at 1104. In some embodiments, the virtual proxy is added to the image of virtual content based on the pose of the user device with respect to the holopad in the first holopad system. This use of pose preserves the spatial relationship between the user and the virtual content, so that relationship is replicated with the virtual proxy in the second holopad system.

In some embodiments, the first holopad system may add the virtual proxy to the images of the virtual content, and provide those images to the second holopad system. Alternatively, the first holopad system may transmit, to the second holopad system, the virtual proxy, or information representing the virtual proxy, along with information describing the pose of the user device with respect to the structure, thereby enabling the second holopad system to generate an image of the virtual content that includes the virtual proxy.

Finally, the process 1100 may include displaying the image in the second holopad system, at 1106. For example, the image may be displayed on one or more user devices employed by users of the second holopad system to view the virtual content.

In some embodiments, the disclosed systems may cooperate to present the virtual content in the same geographical orientation at each system. In such embodiments, each system may use compass directions to orient the virtual content. For example, virtual content representing a building may be oriented so the north side of the building faces north. In such embodiments, the physical holopad may include a compass. In some embodiments, the compass may be visible to the users so the users can rotate the holopad to face north. In some embodiments, the compass may include a transmitter to transmit direction information to the devices that generate the images of the virtual content, which may employ that direction information to rotate the virtual content accordingly. In some embodiments, the physical holopad may include a design element that indicates how the holopad should be placed in a room to provide a desired perspective of the virtual content to an audience. For example, the top of the holopad may have an arrow with the word "Audience" to indicate proper orientation.

These techniques may be employed for the positioning of the virtual proxies as well. For example, when a user of a first holopad is located to the west of the virtual content, the virtual proxy may be presented in the second holopad system to the west of the virtual content. In some case, users in multiple systems may occupy the same position relative to the virtual content. Superimposing virtual proxies of these users could be disconcerting to users. Therefore, in some embodiments, the system may display the virtual proxies such that they don't appear on top of each other.

It may be desirable to match the lighting conditions of the virtual content and virtual proxies with the lighting conditions where the virtual content will be shown. Therefore, in some embodiments, the physical holopad and/or user devices may include a camera for detecting ambient lighting conditions. The camera may have a wide field of view, for example having a fisheye lens. The computing system(s) and/or devices generating the images of the virtual content may then adjust the lighting of the virtual content accordingly.

Some embodiments provide a robust annotation capability. In some embodiments, a user may create media and associate that media with virtual content as an annotation. Any media may be used. By way of nonlimiting example, the media may include text, images, video segments, audio segments, and combinations thereof.

The annotation and virtual content may be stored, and may be made available for access by other users. Other users may add additional annotations. An additional annotation may be linked to a previous annotation, or may be independent of other annotations. Other features of these embodiments are described in detail below.

Figure 12:
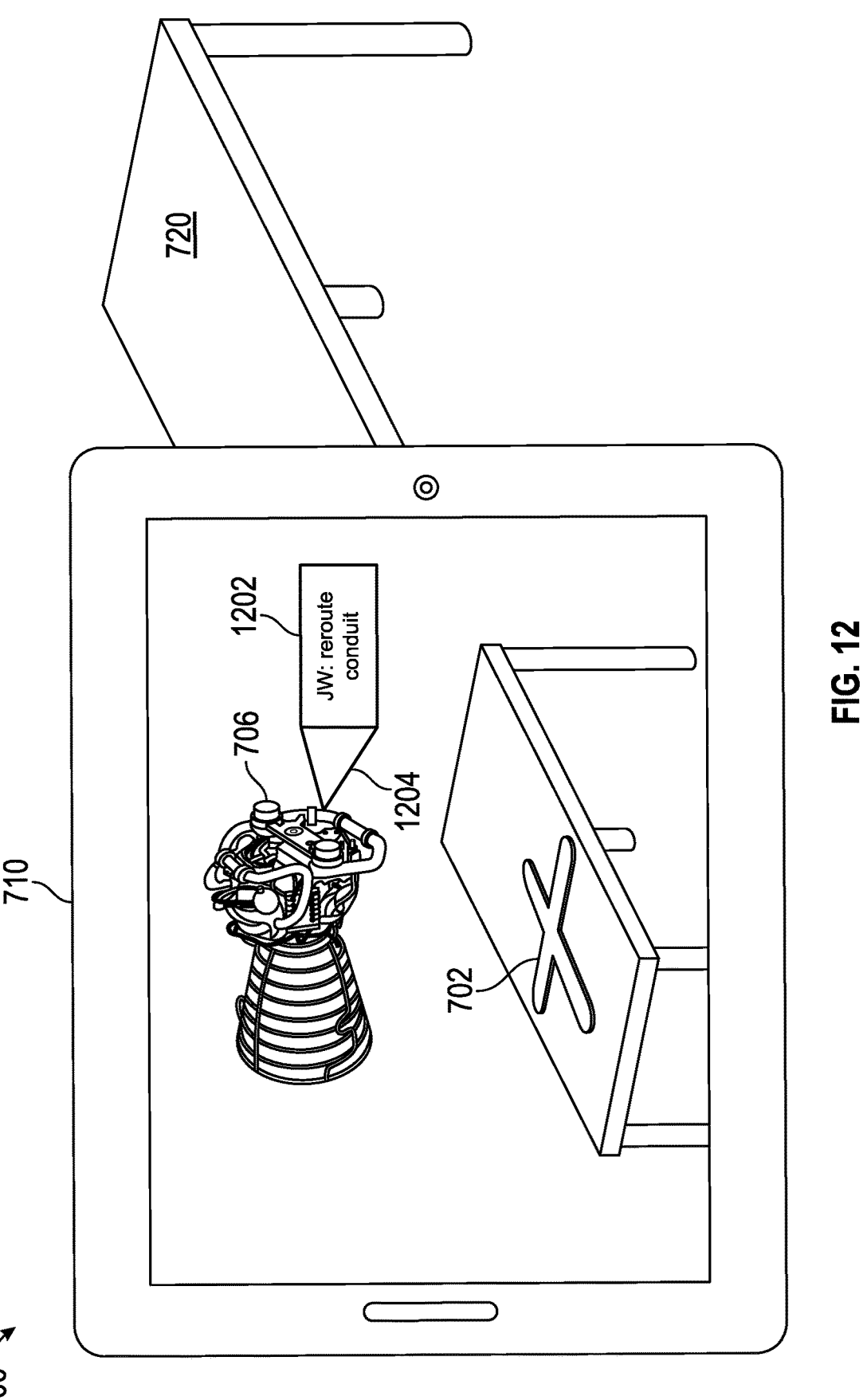
FIG. 12 illustrates the augmented reality collaboration system 700 of FIG. 7 with a user JW adding a text annotation to virtual content according to some embodiments of the disclosed technology.

FIG. 12 illustrates the augmented reality collaboration system 700 of FIG. 7 with a user adding a text annotation to virtual content according to some embodiments of the disclosed technology. While the annotation process is depicted and described in a virtual holopad system, it should be appreciated that the annotation process applies to physical holopad systems, and systems that include both physical and virtual holopads, as well.

Referring to FIG. 12, the user is using a tablet 710 to add the annotation. However, any device capable of performing the described functions may be used to add annotations. By way of nonlimiting example, the user may use a head-mounted device that captures user inputs using a gestural interface. As another nonlimiting example, user may employ a workstation to add annotations.

In the example of FIG. 12, a user with the initials JW has used tablet 710 to create text media that reads "reroute conduit." In this example, a user may initiate the annotation process with a long press on the touchscreen of the tablet 710 at a desired location of interest in the virtual content. In response, the system may "freeze" the image, and hold the image even as the pose of the user changes. For example, the user may place the tablet 710 on the table 720 while adding the annotation. An annotation pane 1202 may appear with a tail 1204 joining the annotation pane 1202 to the location of interest in the virtual content. The user may then add the media in the annotation pane 1202. When the user is satisfied with the annotation, may commit the annotation, for example with a long press on the annotation pain 1202. In response, the system may store the annotation and the virtual content, and make it available for access by other devices.

In some embodiments, the system may store the user's view of the virtual content as well. For example, the system may determine the pose of the user with respect to the physical location where the virtual content is depicted, and may store a view of the annotation and virtual content according to the determined pose. Other users may operate user devices to retrieve and display that view. In any case, users may view the virtual content and the annotation from any angle.

As described above, some embodiments may provide asynchronous operation, where generating an annotation by one user, and viewing that annotation by other users, may take place at different times. Some embodiments may provide synchronous operation, where users may view another user's annotation as soon as it is committed, or even while the annotation is being generated.

In some embodiments, a user device that generates an annotation may be proximate to a user device that views that annotation. For example, both user devices may be in the same room, and may be viewing the virtual content depicted in the same physical location in the room. In some embodiments, a user device that generates an annotation may be remote from the user device that views that annotation. For example, user devices may be in different rooms, in different buildings, or separated by large distances.

Figure 13:
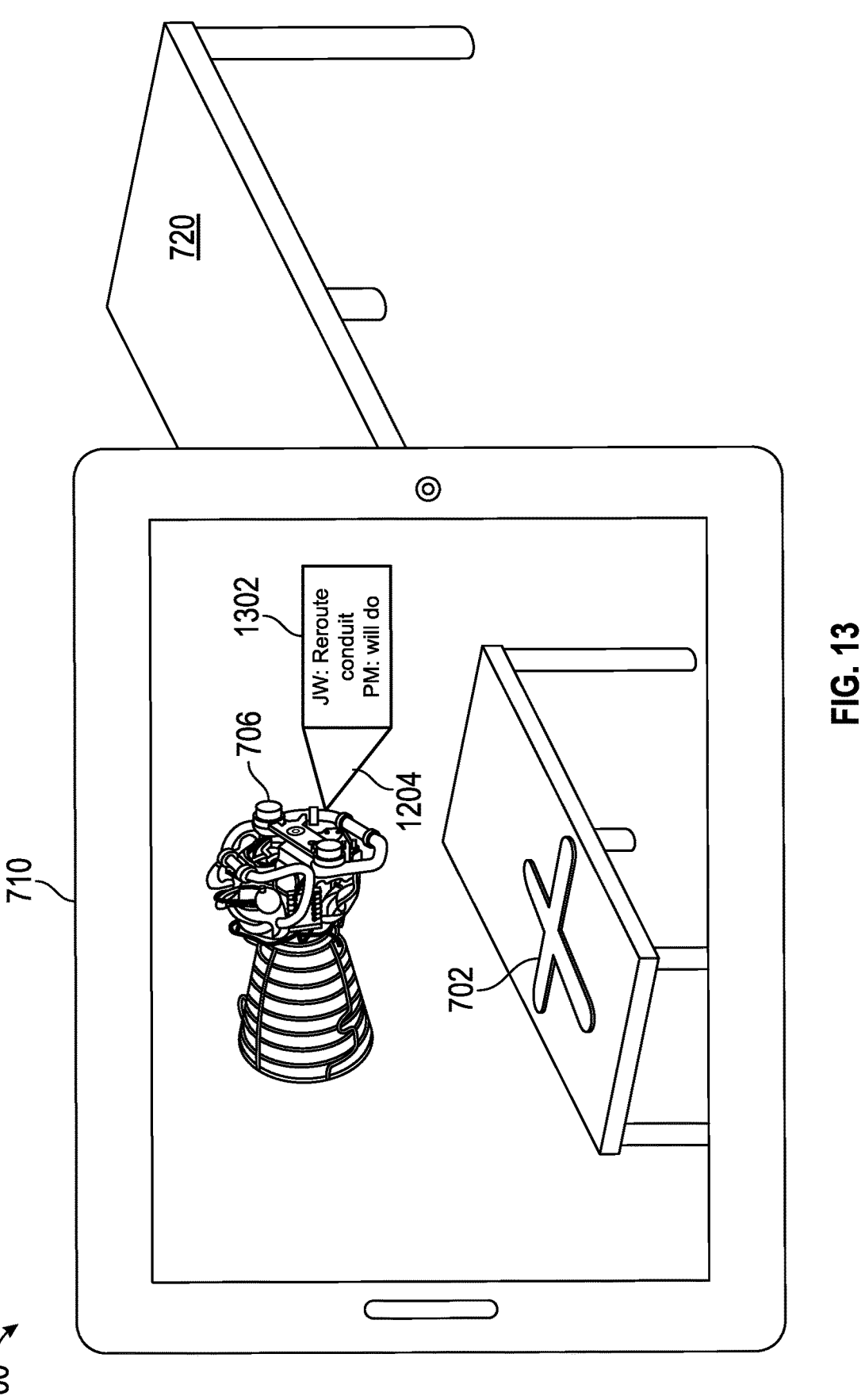
FIG. 13 illustrates the augmented reality collaboration system of FIG. 12 where a second user PM has added a text annotation to the virtual content in response to user JW's initial text annotation, according to some embodiments of the disclosed technology.

FIG. 13 illustrates the augmented reality collaboration system of FIG. 12 where user JW sees that a second user has added a text annotation to the virtual content according to some embodiments of the disclosed technology. Referring to FIG. 13, user JW employs tablet 710 to see that another user with initials PM has added a text annotation that reads "will do." In this example, PM's annotation is linked to JW's annotation. This linkage may be indicated by displaying both annotations in the same annotation pane 1302, as shown in FIG. 13.

Figure 14:
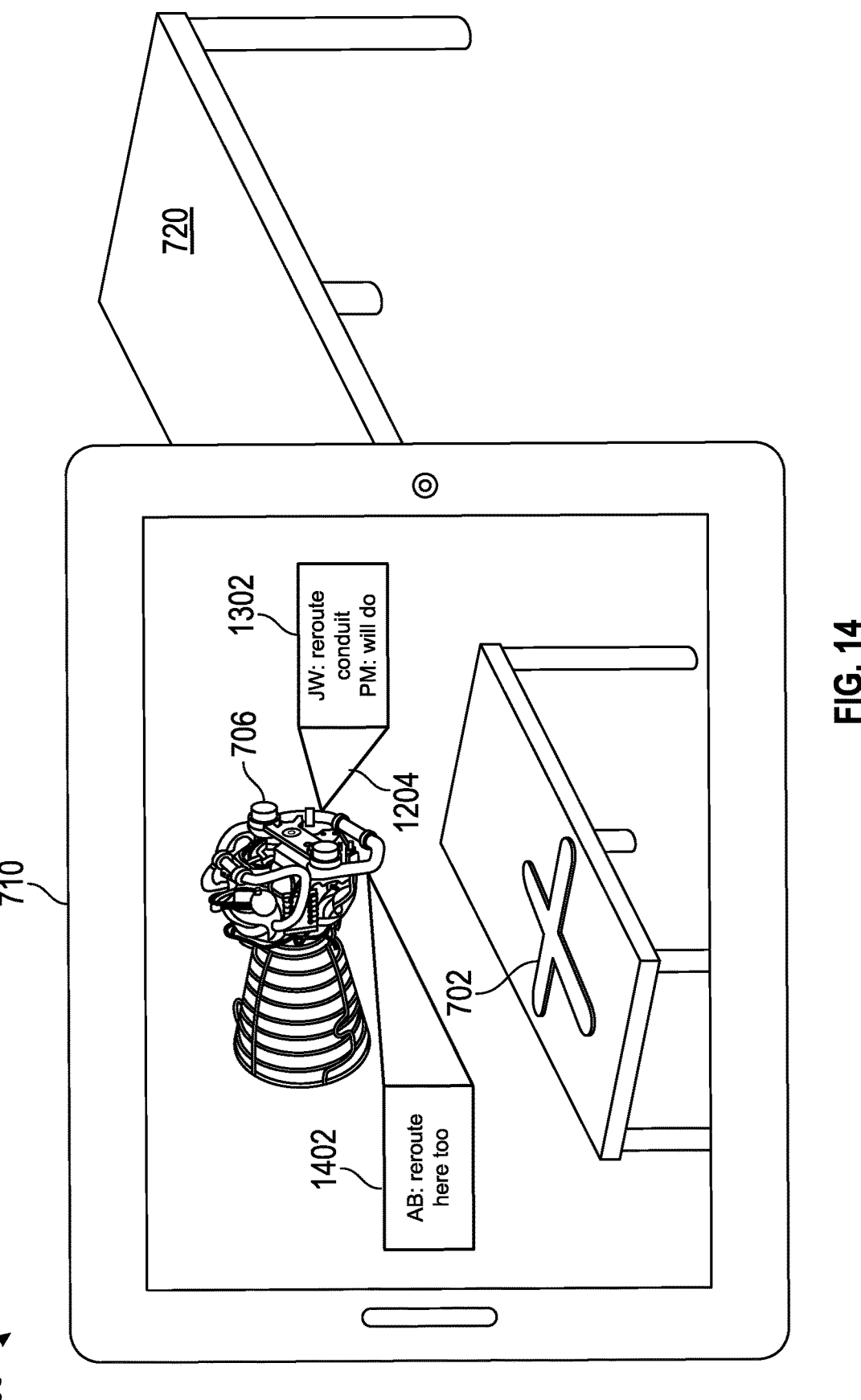
FIG. 14 illustrates the augmented reality collaboration system of FIG. 13 where a third user AB has added a further text annotation to the virtual content according to some embodiments of the disclosed technology.

FIG. 14 illustrates the augmented reality collaboration system of FIG. 13 where user JW sees that a third user has added a text annotation to the virtual content according to some embodiments of the disclosed technology. Referring to FIG. 14, user JW employs tablet 710 to see that another user with initials AB has added a text annotation that reads "reroute here too." In this example, AB's annotation is independent of the annotations of JW and PB. This independence may be indicated by displaying AB's annotations in a different annotation pane 1402, as shown in FIG. 14.

FIG. 15 is a flowchart of an annotation process 1500 for a holopad system according to some embodiments of the disclosed technology. The annotation process 1500 applies to systems that include physical holopads, virtual holopads, or both. For example, the process 1500 may be performed by the physical holopad system 100 of FIG. 1, the virtual holopad system 700 of FIG. 7, or both.

Referring to FIG. 15, the process 1500 may include generating a first image depicting virtual content in a virtual location corresponding to a physical location in a physical environment of the first user device, at 1502. The image may be generated as described elsewhere herein. Generating the image may include determining a pose of the first user device with respect to the physical location, and generating the first image based on the pose.

The process 1500 may include displaying the first image in one or more displays of the first user device, at 1504. The image may be displayed as described elsewhere herein. The user device may be a handheld device, a head-mounted device, a workstation, or a similar device. By way of nonlimiting example, the media may include text, images, video segments, audio segments, hyperlinks, and combinations thereof. The media may include a recording of a virtual content session, which may include manipulating the virtual content, spoken content of the users in the session, and annotations added by the users.

The process 1500 may include enabling the user to create media and associate that media with the virtual content in the first image in the form of an annotation, at 1506. For example, the user may create an annotation as described above with reference to FIGS. 12-14.

The process 1500 may include storing the annotation and virtual content, at 1508, and making the annotation and virtual content available for access by a plurality of additional user devices, at 1510. For example, the annotation and virtual content may be stored in a networked server that is accessible by the user devices. Local storage may be used as well.

The process 1500 may include retrieving the stored annotation and virtual content, at 1512. For example, annotation and virtual content may be retrieved from a networked server. The annotation and virtual content may be retrieved by any user device, including the user device that created the annotation. The annotation and virtual content may be shared by hyperlinks and the like. The annotation and virtual content may be retrieved by selecting the shared link.

The process 1500 may include generating a second image based on the retrieved annotation and virtual content, at 1514, and displaying the second image in one or more displays of the user device, at 1516. The second image may be generated and displayed as described elsewhere herein.

Figure 16:
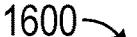
FIG. 16 is an example computing component that may be used to implement various features of embodiments described in the present disclosure.

FIG. 16 depicts a block diagram of an example computer system 1600 in which embodiments described herein may be implemented. The computer system 1600 includes a bus 1602 or other communication mechanism for communicating information, one or more hardware processors 1604 coupled with bus 1602 for processing information. Hardware processor(s) 1604 may be, for example, one or more general purpose microprocessors.

The computer system 1600 also includes a main memory 1606, such as a random access memory (RAM), cache and/or other dynamic storage devices, coupled to bus 1602 for storing information and instructions to be executed by processor 1604. Main memory 1606 also may be used for storing temporary variables or other intermediate information during execution of instructions to be executed by processor 1604. Such instructions, when stored in storage media accessible to processor 1604, render computer system 1600 into a special-purpose machine that is customized to perform the operations specified in the instructions.

The computer system 1600 further includes a read only memory (ROM) 1608 or other static storage device coupled to bus 1602 for storing static information and instructions for processor 1604. A storage device 1610, such as a magnetic disk, optical disk, or USB thumb drive (Flash drive), etc., is provided and coupled to bus 1602 for storing information and instructions.

The computer system 1600 may be coupled via bus 1602 to a display 1612, such as a liquid crystal display (LCD) (or touch screen), for displaying information to a computer user. An input device 1614, including alphanumeric and other keys, is coupled to bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. In some embodiments, the same direction information and command selections as cursor control may be implemented via receiving touches on a touch screen without a cursor.

The computing system 1600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C, C++, and Python. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1600 may implement the techniques described herein using customized hard-wired logic, one or more ASICs or FPGAs, firmware and/or program logic which in combination with the computer system causes or programs computer system 1600 to be a special-purpose machine. According to one embodiment, the techniques herein are performed by computer system 1600 in response to processor(s) 1604 executing one or more sequences of one or more instructions contained in main memory 1606. Such instructions may be read into main memory 1606 from another storage medium, such as storage device 1610. Execution of the sequences of instructions contained in main memory 1606 causes processor(s) 1604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1610. Volatile media includes dynamic memory, such as main memory 1606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1602. Transmission media can also take the form of acoustic or light waves, such as those generated during radio-wave and infra-red data communications.

The computer system 1600 also includes a communication interface 1618 coupled to bus 1602. Network interface 1618 provides a two-way data communication coupling to one or more network links that are connected to one or more local networks. For example, communication interface 1618 may be an integrated services digital network (ISDN) card, cable modem, satellite modem, or a modem to provide a data communication connection to a corresponding type of telephone line. As another example, network interface 1618 may be a local area network (LAN) card to provide a data communication connection to a compatible LAN (or a WAN component to communicate with a WAN). Wireless links may also be implemented. In any such implementation, network interface 1618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 1618, which carry the digital data to and from computer system 1600, are example forms of transmission media.

The computer system 1600 can send messages and receive data, including program code, through the network(s), network link and communication interface 1618. In the Internet example, a server might transmit a requested code for an application program through the Internet, the ISP, the local network and the communication interface 1618.

The received code may be executed by processor 1604 as it is received, and/or stored in storage device 1610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technology that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A first user device configured to display virtual content, the first user device comprising:

at least one memory; and at least one processor coupled to the at least one memory and configured to:

determine a first pose of the first user device with respect to a physical environment of the first user device;

generate, based on the first pose, virtual content in a virtual location corresponding to a physical location in the physical environment of the first user device, wherein a pose of the virtual content representing a spatial relationship between the first user device and the virtual content is determined based on the first pose of the first user device;

cause at least one display to display the virtual content in the pose;

receive user input from a user of the first user device to add additional virtual content and to associate the additional virtual content with the virtual content;

determine a second pose of the first user device with respect to the physical environment of the first user device, wherein the second pose is different from the first pose;

when the first user device is in the second pose, cause the at least one display to display the virtual content with the additional virtual content in the pose with respect to the first pose of the first user device;

receive user input to modify the additional virtual content when the first user device is in a third pose, wherein the third pose is different from the first pose and the second pose;

cause, in response to receiving the user input, the at least one display to display the virtual content and the modified additional virtual content in the pose with respect to the first pose of the first user device as the first user device changes from the third pose to a fourth pose and as the additional virtual content is modified based on the user input; and store the virtual content and the additional virtual content for access by a plurality of additional user devices.

2. The first user device of claim 1, wherein the additional virtual content is generated by a second user device.

3. The first user device of claim 2, wherein the second user device is a handheld device.

4. The first user device of claim 1, wherein the first user device is a head-mounted device.

5. The first user device of claim 1, wherein, to cause the at least one display to display the virtual content with the additional virtual content in the pose with respect to the first pose when the first user device is in the second pose, the at least one processor is configured to:

maintain an image comprising the virtual content in the at least one display as one or more poses of the first user device change while adding the additional virtual content to the virtual content.

6. The first user device of claim 1, wherein the at least one processor is configured to:

cause a view of the additional virtual content and the virtual content according to the first pose to be stored.

7. The first user device of claim 6, wherein the at least one processor is configured to:

output the stored view of the additional virtual content and the virtual content to at least one additional user device of the plurality of additional user devices.

8. The first user device of claim 7, wherein the at least one processor is configured to:

output a first image of the virtual content for display by the at least one display synchronously with a second image of the virtual content displayed by at least one display of the at least one additional user device.

9. The first user device of claim 7, wherein the at least one additional user device is proximate to the first user device.

10. The first user device of claim 7, wherein the at least one additional user device is remote from the first user device.

11. The first user device of claim 7, wherein the at least one processor is configured to:

receive, from the at least one additional user device, further virtual content associated with the virtual content.

12. The first user device of claim 1, wherein the virtual content comprises at least one of:

text;

an image;

a video segment; or an audio segment.

13. The first user device of claim 1, further comprising the at least one display.

14. The first user device of claim 1, wherein the at least one processor is configured to:

store the additional virtual content and the virtual content in the at least one memory.

15. The first user device of claim 1, wherein the additional virtual content includes an annotation to the virtual content.

16. The first user device of claim 1, wherein the virtual content and the modified additional virtual content are displayed in the pose with respect to the first pose of the first user device as one or more poses of the first user device change.

17. A method of generating one or more annotations at a first user device, the method comprising:

determining a first pose of the first user device with respect to a physical environment of the first user device;

generating, based on the first pose, virtual content in a virtual location corresponding to a physical location in the physical environment of the first user device, wherein a pose of the virtual content representing a spatial relationship between the first user device and the virtual content is determined based on the first pose of the first user device;

display the virtual content in the pose using at least one display;

receive user input from a user of the first user device to add additional virtual content and to associate the additional virtual content with the virtual content;

determine a second pose of the first user device with respect to the physical environment of the first user device, wherein the second pose is different from the first pose;

when the first user device is in the second pose, display the virtual content with the additional virtual content using the at least one display in the pose with respect to the first pose of the first user device;

receiving user input to modify the additional virtual content when the first user device is in a third pose, wherein the third pose is different from the first pose and the second pose;

display, in response to receiving the user input, the virtual content and the modified additional virtual content in the pose with respect to the first pose of the first user device as the first user device changes from the third pose to a fourth pose and as the additional virtual content is modified based on the user input; and store the additional virtual content and the virtual content for access by a plurality of additional user devices.

18. The method of claim 17, wherein the additional virtual content is generated by a second user device.

19. The method of claim 18, wherein the second user device is a handheld device.

20. The method of claim 17, wherein the first user device is a head-mounted device.

21. The method of claim 17, wherein displaying the virtual content with the additional virtual content in the pose with respect to the first pose when the first user device is in the second pose comprises:

maintain an image comprising the virtual content in the at least one display as one or more poses of the first user device change while adding the additional virtual content to the virtual content.

22. The method of claim 17, further comprising:

storing a view of the additional virtual content and the virtual content according to the first pose.

23. The method of claim 22, further comprising:

outputting the stored view of the additional virtual content and the virtual content to at least one additional user device of the plurality of additional user devices.

24. The method of claim 23, further comprising:

displaying, using the at least one display, a first image of the virtual content synchronously with a second image of the virtual content displayed by at least one display of the at least one additional user device.

25. The method of claim 23, wherein the at least one additional user device is proximate to the first user device.

26. The method of claim 23, wherein the at least one additional user device is remote from the first user device.

27. The method of claim 23, further comprising:

receiving, from the at least one additional user device, further virtual content associated with the virtual content.

28. The method of claim 17, wherein the additional virtual content comprises at least one of:

text;

an image;

a video segment; or an audio segment.

29. The method of claim 17, wherein the at least one display is part of the first user device.

30. The method of claim 17, wherein the virtual content and the additional virtual content are stored in at least one memory of the first user device.

31. The method of claim 17, wherein the additional virtual content includes an annotation to the virtual content.

32. The method of claim 17, wherein the virtual content and the modified additional virtual content are displayed in the pose with respect to the first pose of the first user device as one or more poses of the first user device change.

* * * * *